(No Model.)

G. E. WITHERELL.
AUTOMATIC SCREW MACHINE.

No. 589,379.  Patented Aug. 31, 1897.

Witnesses.
Harrie E. Hart
Arthur B. Jenkins.

Inventor.
George E. Witherell.
by Chas. L. Burdett
Attorney.

(No Model.) 5 Sheets—Sheet 2.

G. E. WITHERELL.
AUTOMATIC SCREW MACHINE.

No. 589,379. Patented Aug. 31, 1897.

Witnesses.

Inventor.
George E. Witherell.
by Chas. L. Burdett
Attorney.

(No Model.) 5 Sheets—Sheet 3.
G. E. WITHERELL.
AUTOMATIC SCREW MACHINE.

No. 589,379. Patented Aug. 31, 1897.

Witnesses.

Inventor.
George E. Witherell.
by Chas. L. Burdett
Attorney.

(No Model.) 5 Sheets—Sheet 4.

G. E. WITHERELL.
AUTOMATIC SCREW MACHINE.

No. 589,379. Patented Aug. 31, 1897.

Witnesses.

Inventor.
George E. Witherell.
by Chas. L. Burdett,
Attorney.

(No Model.)  5 Sheets—Sheet 5.

G. E. WITHERELL.
AUTOMATIC SCREW MACHINE.

No. 589,379.  Patented Aug. 31, 1897.

Witnesses  Inventor
  George E. Witherell,
  by Chas. L. Burdett,
  Attorney.

THE NORRIS PETERS CO., PHOTO-LITHO., WASHINGTON, D. C.

UNITED STATES PATENT OFFICE.

GEORGE E. WITHERELL, OF HARTFORD, CONNECTICUT, ASSIGNOR TO THE HARTFORD MACHINE SCREW COMPANY, OF SAME PLACE.

AUTOMATIC SCREW-MACHINE.

SPECIFICATION forming part of Letters Patent No. 589,379, dated August 31, 1897.

Application filed September 18, 1896. Serial No. 606,306. (No model.)

*To all whom it may concern:*

Be it known that I, GEORGE E. WITHERELL, a citizen of the United States, and a resident of Hartford, in the county of Hartford and State of Connecticut, have invented certain new and useful Improvements in Automatic Screw-Machines, of which the following is a full, clear, and exact description, whereby any one skilled in the art can make and use the same.

My invention relates to the class of machines used for making screws or other small articles that are required to be turned or otherwise formed to shape, these being cut from a rod of stock and submitted to different automatic operations of the machine until completed, the tools for performing these operations being moved up to and away from the work.

The object of my invention is to provide in a machine of this class means for economically producing a high grade of work in the least possible time and for inclosing certain parts of the machine in such manner that they may be readily uncovered when required, and also to provide a turret that shall be positively and firmly clamped during the operations of the tools carried thereby.

To this end my invention consists in the details of the several parts making up the machine as a whole and in their combination, as hereinafter described, and pointed out in the claims.

Referring to the drawings.

In the accompanying drawings the numeral 1 indicates the frame of the machine, made of any ordinary material, as iron.

2 denotes the driving-shaft, mounted in bearings and extending across one end of the machine and bearing a pulley 3, by means of which it may be driven from any suitable source of power. This driving-shaft has a worm in mesh with a worm-wheel 4, secured to the cam-shaft 5, extending lengthwise of the machine and bearing cams for performing the various operations for which the machine is intended.

A reverse-motion is mounted in standards 6 on the machine and has the pulleys 7 for imparting motion to it, a lever 8 and cam 9 being employed to operate this reverse motion. A feeding mechanism 10 and a chucking mechanism 11 are located back of the reverse-motion, the rod of stock from which articles are to be manufactured extending through these devices, and carriages 12 and 13, reciprocated by the cam-wheel 14, being employed to operate the feeding and chucking mechanisms, respectively.

A sliding tool-carriage 15 is mounted on the frame of the machine and is reciprocated by the levers 16, in engagement with the cam 17 on the cam-shaft 5.

All of the mechanism above described is old and forms no part of the present invention, and a further description thereof is deemed unnecessary herein, this mechanism being chosen for the purpose of properly illustrating the operation of the mechanism forming the subject-matter of the within invention.

Figures 19, 20, 21:
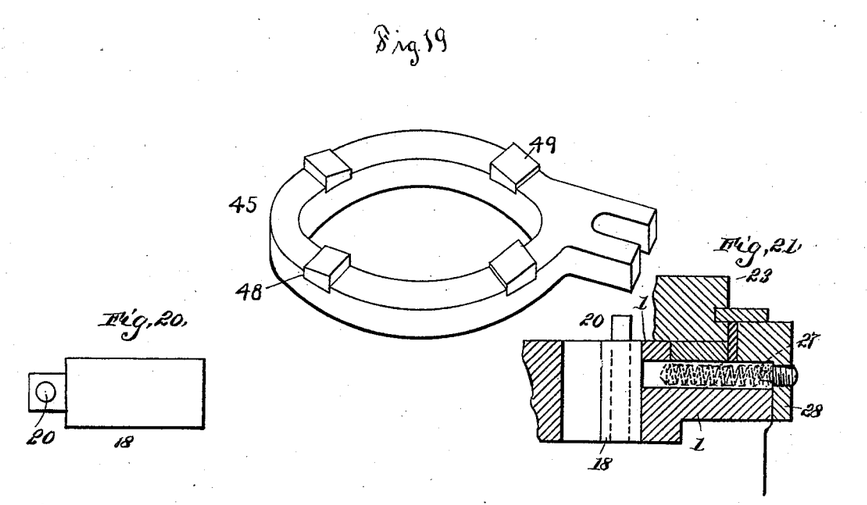
Fig. 19 is a detail perspective view of the clamping-ring.
Fig. 20 is a detail top view of the ratchet-bolt.
Fig. 21 is a detail view in section of a portion of the machine, showing the ratchet-bolt in side elevation.

A slideway is formed in the upper side part of the frame of the machine, near one end, in which is located a ratchet-bolt 18, which has a sliding movement therein. This bolt has a lateral enlargement on one end, closely fitting (so as to slide easily therein) a ratchet-bolt socket 19, made depthwise through the frame. A ratchet-bolt pin 20 is secured within a hole in the enlargement on this ratchet-bolt, the upper end of the pin engaging the teeth of a ratchet 21, secured to the hub of a turret 22. This ratchet-bolt is held normally in the path of movement of the ratchet by any suitable mechanism, as by means of a ratchet-bolt spring thrusting with one end against a shoulder on the ratchet-bolt and the other end against the outer wall of the slideway in the side part of the frame of the machine.

The turret 22 is secured to a turret-slide 23, that has a reciprocating movement lengthwise of the frame in the turret-slideway 24 through the medium of the main cam 25, secured to the cam-shaft 5, that engages a main-cam stud 26, secured to the turret-slide 23.

Figure 1:
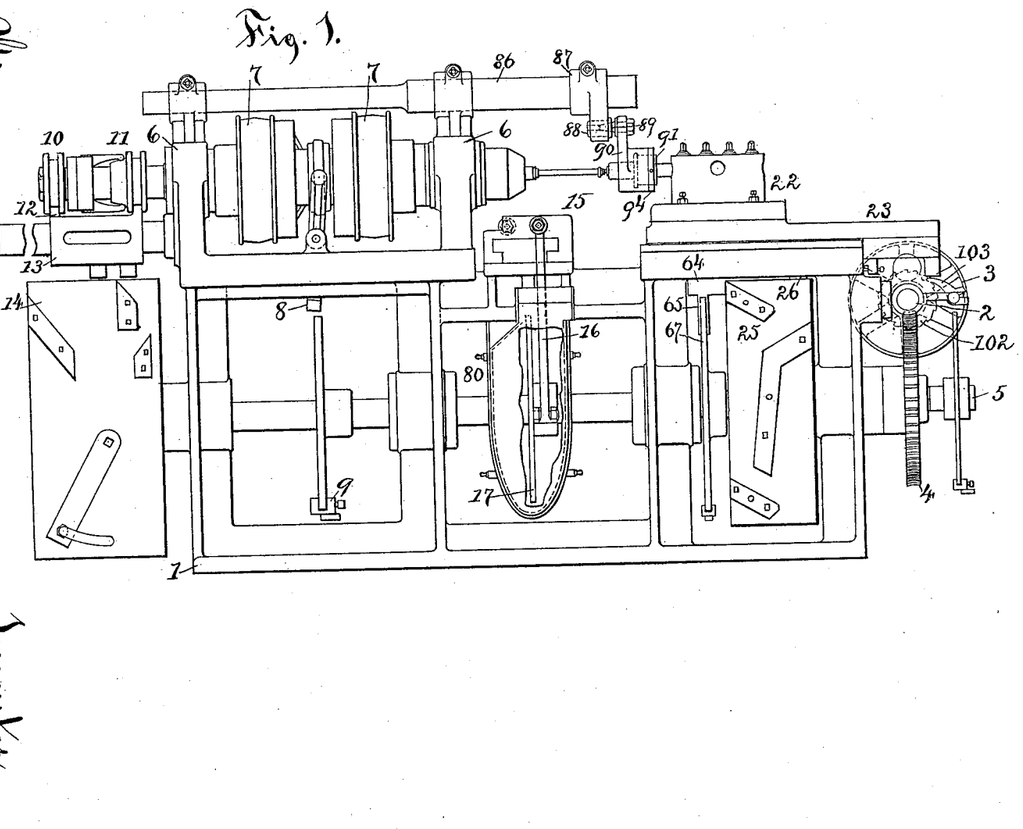
Figure 1 is a view in front elevation of a machine embodying my invention.
Figures 2, 3, 4, 5, 6, 7, 15, 16:
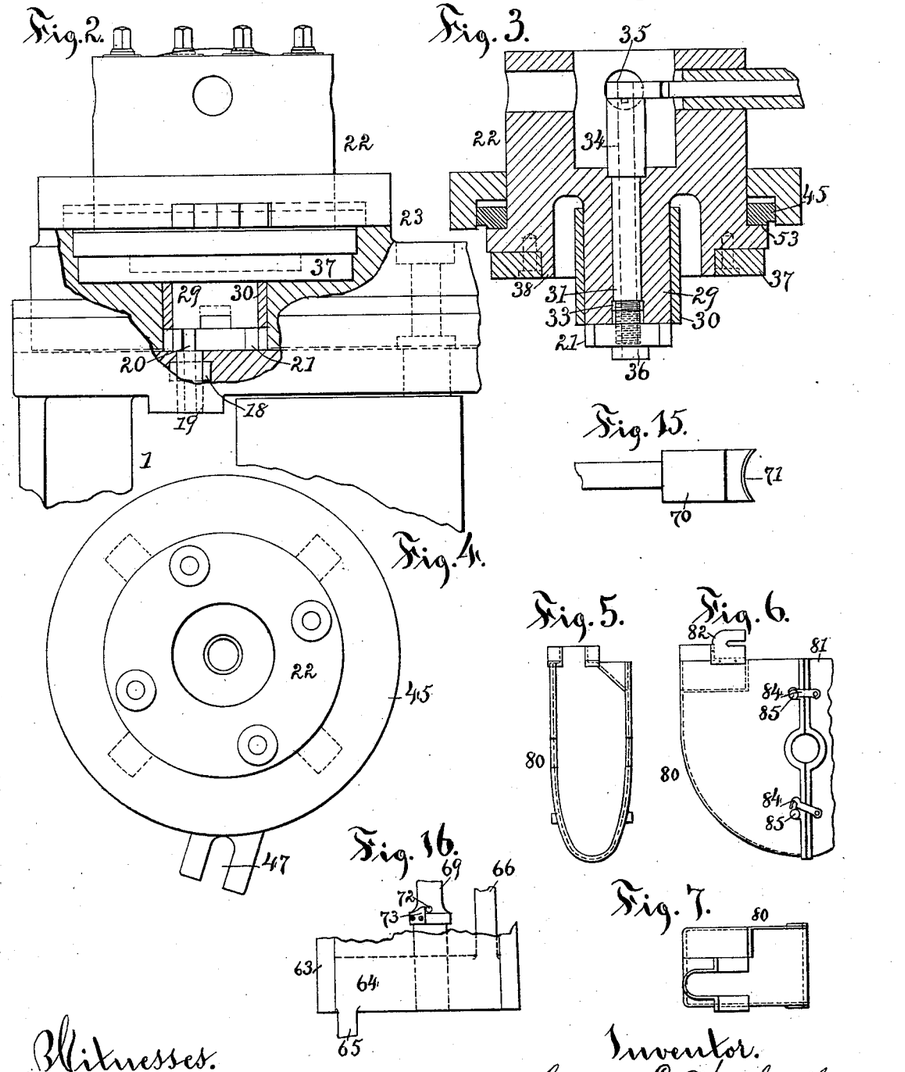
Fig. 2 is a detail view, in rear elevation, on enlarged scale, showing a portion of the frame and the tool-holding turret with parts broken away to show construction.
Fig. 3 is a detail view, in vertical central section, through the turret and adjacent parts.
Fig. 4 is a detail top view of the turret and adjacent parts.
Fig. 5 is a front view of one-half of one of the lever-inclosing cases.
Fig. 6 is a detail side view showing the locking means.
Fig. 7 is a detail top view of one of the sections.
Fig. 15 is a detail view showing a portion of the plunger for operating the index-bolt.
Fig. 16 is a detail view looking from the rear of the locking-lever bracket and showing the stop and pin on the rotary head.
Figure 8:
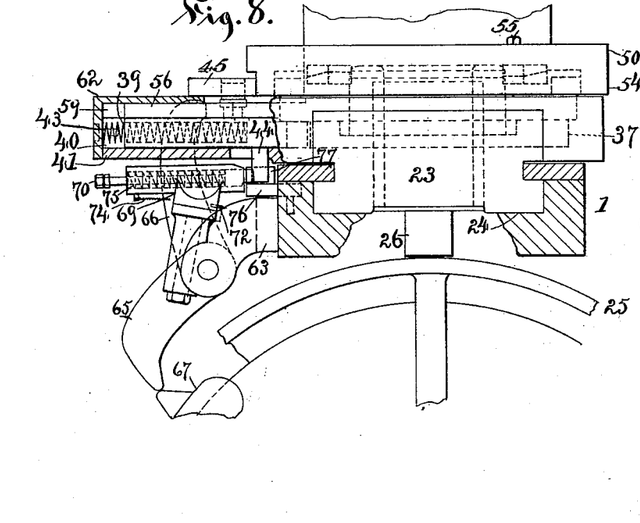
Fig. 8 is a detail view, in end elevation, of a portion of the machine, illustrating the turret-locking mechanism.
Figure 9:
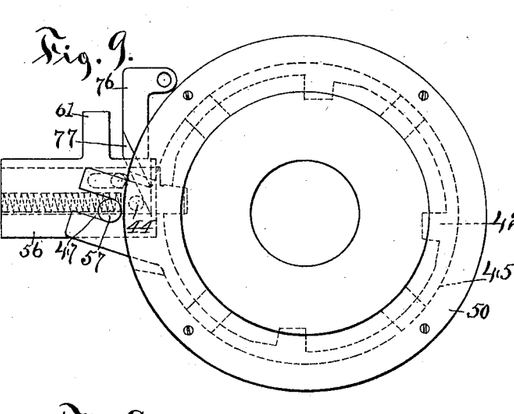
Fig. 9 is a detail top view of the turret, showing the locking mechanism.
Figure 10:
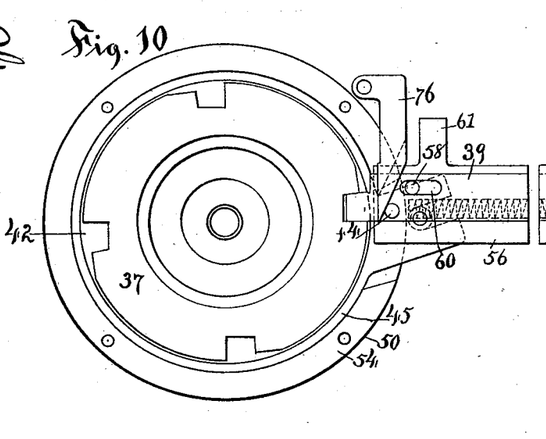
Fig. 10 is a detail bottom view of the same.

The turret 22 is borne in an angular socket in the upper part of the turret-slide, the hub 29 of the turret extending through the turret-slide, a bushing 30 being secured on this hub. A ratchet-pin 31 extends through a central opening in the turret, the ratchet 21 being secured on the lower threaded end of this ratchet-pin, and a projection on the upper side of the ratchet-wheel engages a diametrical slot in the lower end of the hub of the turret. By the engagement of this projection in the slot the turret is caused to revolve with the ratchet. A flange 33, preferably round, located centrally on the ratchet, engages a similar-shaped opening in the center of the bottom of the turret for the purpose of centering the parts.

A die-closing spindle 34 extends through a central opening in the ratchet-pin 31, a die-closing-cam 35 being secured to the upper end of the spindle, the screw-threaded lower end of which engages with a screw-threaded opening in a die-closing plate 36. This die-closing plate is secured to the under surface of the turret-slide, so that the die-closing cam and spindle are held stationary during the revolutions of the turret.

An index-ring 37 is secured to the under side of the turret, a flange 38 on the turret extending through a central opening in the index-ring. An index-bolt 39 is located in an index-bolt socket 40 in a lateral projection 41 from the turret-slide and is adapted to engage the bolt-sockets 42 in the edge of the index-ring 37. An index-bolt stud 44 projects downward from the under side of the index-bolt through a slot in the bottom wall of the index-bolt socket.

A cam-latch 76 is pivoted on the frame of the machine and has an upward-projecting cam 77, located in the path of movement of the index-bolt stud, a suitable spring or like means being employed to exert pressure on the latch toward the turret-slide. An index-bolt spring is located in a socket in the index-bolt with its outer end thrusting against a wall of the socket and its inner end against the bolt, tending normally to thrust the latter inward.

Figure 18:
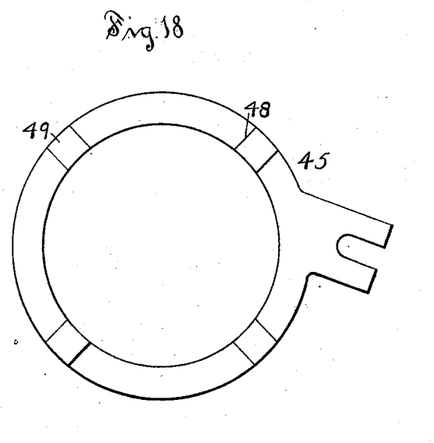
Fig. 18 is a detail top view of the clamping-ring.

A cam-ring 45 rests on an annular shoulder 53 on the lower part of the turret and has a rotary movement thereon. A cam projection extends outward from one side of the cam-ring and has a cam-slot therein. In the upper surface of the ring are formed cam-sockets 48, in which are firmly secured cams 49.

Figure 11:
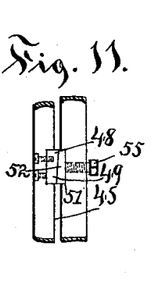
Fig. 11 is a detail view in section through the clamping-ring and clamping-ring cover, showing the locking-wedges.
Figure 17:
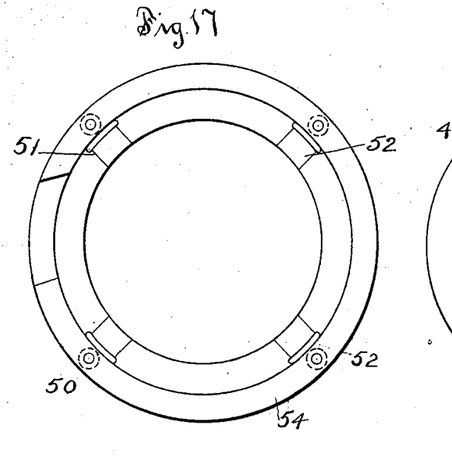
Fig. 17 is a detail bottom view of the cover-plate.

A cover-plate 50 has a downward-projecting annular flange 54, resting on the turret-slide, screws or other suitable means for securing the cover to the turret-slide passing downward through the former and through this flange. This flange completely incloses the outer edge of the cam-ring, the latter, however, being loose enough therein to turn freely. In the under surface of the cover-plate are formed cam-sockets 51 in proper position to register with the cam-sockets 48 in the cam-ring, cams 52 being located in these sockets. The cams 49 and 52 are beveled in opposite direction, and the latter are backed up by cam-screws 55, extending through the cover-plate and providing an adjustment for the cams. By this construction as the cam-ring is turned in the proper direction the opposing faces of the bevel-cams are brought together and the cam-ring 45 forced down onto the annular shoulder 53 on the turret, holding the latter firmly in place. It will be noted from this construction that the turret has an extremely wide bearing portion in its socket in the turret-slide, and when the turret has been rotated to a position for the operation of any of the tools borne therein the clamping-ring serves to hold it firmly in this position if for any reason, as by neglect or carelessness of the operative, any of the screws for taking up wear should have been permitted to become loose. This insures at all times stability of the turret during the operation of the tools and the production of accurate work.

A cam-bolt socket 59 is formed in the lateral projection 41 on the turret-slide, this cam-bolt socket being located just above the index-bolt socket, the latter being of sufficient depth to permit of a free movement of the index-bolt underneath the clamping-bolt 56, but the two resting in close proximity to each other. A clamping-bolt stud 57 projects upward from the clamping-bolt into the cam-slot 47 in the cam-ring 45. This cam-slot is formed in a line diagonally across the line of movement of the clamping-bolt stud as the clamping-bolt is moved. A clamping-ring stud extends downward from the under side of the clamping-bolt into an index-bolt slot 60 in the index-bolt. A cam projection 61 is formed on the side of the clamping-bolt 56. A bolt cover-plate 62 is placed over the bolt-sockets in the projection 41 on the turret-slide, covering the top and end of said socket.

Figure 12:
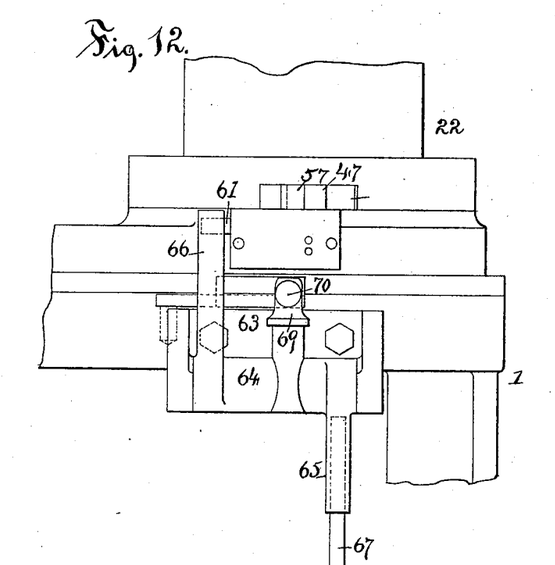
Fig. 12 is a detail view in elevation, showing the mechanism for operating the clamping-ring and index-bolts.

A locking-lever bracket 63 is secured to the frame of the machine, between the side parts of which a locking-lever 64 is pivoted. A cam-lever 65 is rigidly secured to and projects downward from one end of the locking-lever to engage a cam on the turret-cam disk 67. A clamping-bolt lever 66 is rigidly secured to and projects upward from the opposite end of the locking-lever from that on which the cam-lever is located and is adapted to engage the cam projection 61 from the clamping-bolt 56. A plunger-head socket is formed in an enlargement on the locking-lever 64, in which is rotatively located a plunger-head 69. A plunger 70 extends crosswise through the plunger-head, having a groove 71 in its inner end for the reception of the index-bolt stud 44. A plunger-spring 75 surrounds the shank of the plunger in the plunger-head 69, one end of the spring thrusting against a plug in one end of the plunger-head and the opposite end against a shoulder on the plunger. The plunger is prevented from being forced out of the plunger-head by means of a nut located outside of the plug in the plunger-head. A stop 73 is secured to the plunger-head socket, against which the stop-pin 72 is normally held by means of the stop-pin spring 74, one end of which is secured to a pin on the under side of the plunger-head and the opposite end to the side of the clamping-bolt lever. The plunger-spring 75 is made with considerable tension, and the groove in the end of the plunger is for the purpose of surely engaging the index-bolt stud 44. The plunger-head is made rotatable, so that as the turret-slide is moved backward the head will swing to one side to allow the index-bolt stud 44 to disengage itself from the groove, the returning spring 74 immediately rotating the plunger-head to its normal position to again engage the stud when said head shall be forced forward by the cam-lever 65.

In prior machines of this class an objection arises from the fact that chips and dirt accumulating in the operation of the machine and from stock being operated upon are interposed between the surface of the cams or cam-wheels and the levers which they operate, giving to the levers a greater throw than is intended and causing a deeper cut to be made in the work. To obviate this, I have provided a removable sectional lever-casing consisting of the sections 80 and 81. Each of these sections is provided with ears 82, having slots that engage with a snug fit pins located with reference to the slots on the frame of the machine. One of said sections is provided with the pivoted latches 84, which hook over and engage latch-pins 85 on the opposite section. This provides a casing effectually covering the lever and preventing any dirt or chips from getting onto the surface of the cams and affecting the working of the levers, the casing being easily and quickly removed for any purpose and as readily replaced.

Figure 13:
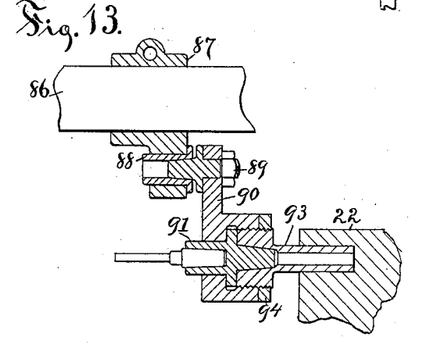
Fig. 13 is a detail view, in central section, through the tool-holding arm.

In the production of articles of small diameter and of considerable length in working with a tool on the outer surface the article is apt to spring under pressure of the tool, thus producing defective work. To obviate this, I have provided an overhanging arm 86, which is adjustably secured to the bearings 6. An overhanging-arm bracket 87 is adjustably secured to the overhanging arm, in which is located a centering-bushing 88. This centering-bushing has a central tapered opening to receive the tapered centering-plug 89, secured to the tool-bracket 90. A shouldered opening is formed centrally through this tool-bracket, and a revolving plug-rest holder 91 projects through this opening, the head of the holder resting on the shoulder within the opening. A revolving plug-rest is located in a socket in the end of the plug-rest holder and is properly formed to engage the work projecting from the chuck-jaws and to firmly support the outer end thereof. A bracket-spindle 93 fits the interior screw-threaded wall of the larger part of the central opening through the tool-bracket and is adapted to be turned firmly down upon the head of the revolving plug-rest holder, a locking-nut 94 on the outer threaded portion of the bracket-spindle securing the parts firmly together. The shank of the bracket-spindle is clamped in one of the tool-sockets in the turret-head.

The centering-bushing and plug for engagement therewith are beveled for the purpose of bringing the revolving plug-rest accurately into line with the work as the turret-slide is moved forward, and the firm engagement of the centering-plug in the centering-bushing and of the revolving plug-rest with the end of the work in parallel lines prevents any swinging movement of the work held in the chuck-jaws.

The operation of the turret-slide and mechanism borne thereon and appurtenant thereto is as follows: The proper tools having been secured within the tool-sockets in the turret and the machine in operation, the turret is intermittently rotated to bring the tools into proper position to operate upon the work held in the chuck-jaws. The turret-slide being at the forward limit of its play, as shown in the views herein, the ratchet-bolt pin 20 is caused to lie in the path of movement of the teeth on the ratchet 21 by the tension of the ratchet-bolt spring 27. As the carriage is moved backward by the action of the cams on the cam-wheel 25, engaging the turret-slide stud 26, the turret is caused to revolve, the ratchet-bolt pin being held stationary with reference to the line of movement of the turret-slide. As the turret-slide begins to move backward, as above described, the index-bolt stud 44 comes in contact with the outer beveled surface of the cam 77 on the cam-latch 76. This cam-latch being prevented from further movement toward the turret, the index-bolt stud is caused to slide along the cam-surface, withdrawing the index-bolt from the bolt-sockets 42 in the edge of the index-ring 37. This movement of the index-bolt brings the end wall of the index-bolt slot 60 into engagement with the clamping-ring stud 58, and as the index-bolt receives further movement the clamping-bolt 67 is also moved outward, revolving the clamping-ring, disengaging the cams, and freeing the turret. This operation is performed just before the ratchet has engaged the ratchet-bolt pin to rotate the turret. As the index-bolt stud 44 frees itself by passing beyond the cam projection 77 the index-bolt spring 43 forces the end of the index-bolt into engagement with the edge of the index-ring, and as the latter is moved in the rotation of the turret one of the sockets 42 is brought opposite the index-bolt, into which the latter is forced by the index-bolt spring. This movement of the index-bolt has been independent of the clamping-ring bolt, the index-bolt slot 60 being of a length sufficient to allow this. The length of this slot, however, is just sufficient to locate the clamping-ring stud near to that end of the index-bolt slot next to the turret in the forward movement of the clamping-ring bolt. As soon as the turret-slide has reached its backward limit of movement, the turret having been revolved to proper position to enable the next tool to perform its share of the work, a cam on the turret-cam disk 67 engages the cam-lever 65 on the locking-lever 64, rotating the locking-lever and causing the plunger 70 to engage the index-bolt stud 44 on the index-bolt 39, forcing the latter home to its seat in the index-bolt socket 42 in the edge of the index-ring 37. A continued rotation of the locking-lever is caused for the purpose of bringing the clamping-bolt lever 66 into contact with the cam projection 61 on the clamping-bolt 56, that is forced inward for the purpose of rotating the clamping-ring to firmly seat the turret in the bottom of its socket just after the index-bolt has been forced home to locate the turret in the proper position for the operation of the tools. The index-bolt spring 43 exerts sufficient pressure to force the locking-bolt home, and when said bolt is seated the rotation of the locking-lever is permitted for the purpose of engaging the clamping-bolt lever with the cam projection 61 by a backward movement of the plunger 70 against the force of the spring 75. Immediately after the index-bolt has been seated and the clamping-ring rotated to clamp the turret the cam on the cam-wheel permits the cam-lever 65 to swing inward to carry the clamping-bolt lever 66 out of engagement with the cam projection 61, this movement being effected by the pressure of the spring 75. This movement of the clamping-ring bolt after the index-bolt has ceased to move locates the clamping-ring stud in that end of the socket in the index-bolt next to the turret, so that any movement of the index-bolt backward will carry with it the clamping-bolt. A cam on the turret-slide cam-wheel now engages the stud on the under side of the turret-slide and moves the latter forward. As the slide is moved forward the engagement of the index-bolt stud 44 with the groove in the end of the plunger 70 causes the plunger-head to be rotated to a degree to allow the pin and groove to be disengaged, when the plunger-head is pulled backward by the spring 74 in a position to again engage the index-bolt stud when the turret-slide shall have again been moved backward to its farthest limit. As the turret-slide moves forward the index-bolt stud 44 engages that side of the cam 77 next to the turret and swings the latch outward under the impulse of a spring to allow the passage of the index-bolt stud beyond the latch, which is immediately returned to place by the spring. In this forward movement of the turret-slide the ratchet-bolt is carried along the outer surface of the ratchet-teeth and moves backward against the pressure of the ratchet-bolt spring 27, and as soon as the edge of the tooth is passed this spring forces the ratchet-bolt forward in front of said tooth. This completes one operation of the machine.

Figure 14:
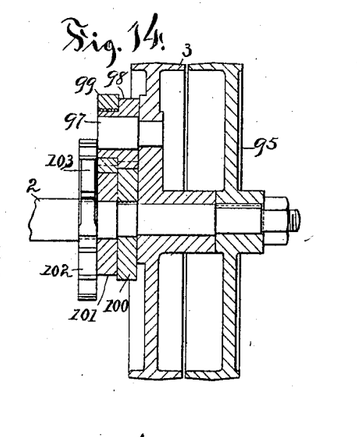
Fig. 14 is a detail view, in central section, through the speed-changing mechanism.

For varying the rate of movement of the shaft 2 a fast pulley 95 and a loose pulley 3 are mounted thereon, adapted to receive a belt from any suitable source of power, any desirable device for shifting the belt from one pulley to the other being employed. The loose pulley bears a stud 97, on which are rotatably mounted the gears 98 and 99, that are caused to rotate together. The gear 98 is in mesh with a gear 100, keyed to the shaft 2, and the gear 99 is in mesh with a gear 101, loose on the shaft, but secured to a ratchet 102, having a pawl 103 to hold it against rotation. The gear 100 in the device illustrated contains a greater number of teeth than the gear 101 and the gear 99 a greater number of teeth than the gear 98, the comparative rate of speed of the shaft 2 and the pulley 3 being determined by the excess in the number of teeth in the gear 100 over that in the gear 101—that is, the greater the excess of the number of teeth in the gear 100 over the number of teeth in the gear 101 the greater will be the rate of speed of the shaft 2 as compared with the rate of speed of the pulley 3. The total number of teeth in the gears 99 and 101 and the total number in the gears 98 and 100 must in each instance, however, be equal.

In the operation of the device rotation of the pulley 3 imparts movement in the same direction to the gears 98 and 99, the gear 98 revolving about the gear 100. In this movement the number of teeth on the gear 101 being less than the number of teeth on the gear 100 that is held against rotation by the friction on the shaft 2 the tendency is to rotate the ratchet and gear 101 in an opposite direction to that in which the gears 98 and 99 are rotated, but by holding the ratchet against rotation by means of the pawl 103 motion is imparted to the gear 100 and the shaft 2, to which it is keyed, in the same direction as that in which the pulley 3 is moving. Should the number of teeth in the gear 101 exceed the number of teeth in the gear 100 and the number of teeth in the gears 98 and 99 be increased and diminished, respectively, the shaft 2 would be revolved in the opposite direction to the rotation of the pulley 3 when the ratchet is held against rotation.

I claim as my invention—

1. In combination with an intermittently-revolving turret, means for rotating the turret, an index-ring borne on the turret and having locking-sockets, a spring-actuated index-bolt adapted to engage said sockets, and automatic means independent of the spring for seating the bolt in a socket, all substantially as described.

2. In combination with an intermittently-revolving turret, means for rotating the turret, an index-ring borne on the turret and having locking-sockets, a spring-actuated index-bolt adapted to engage said sockets, and a locking-lever adapted to automatically engage the index-bolt to seat it in its socket, all substantially as described.

3. In combination with an intermittently-revolving turret, means for revolving the turret, a revoluble clamping-ring surrounding the turret, a cam located on the flat surface of the ring and means for rotating the ring whereby the turret is locked or unlocked.

4. In combination with an intermittently-revolving turret, means for rotating the turret, a revoluble clamping-ring surrounding the turret, means for rotating said ring to lock or unlock the turret, and means for preventing the rotation of the turret whereby locking action of the ring is permitted.

5. In combination with an intermittently-revolving turret, means for revolving the turret, a revoluble clamping-ring surrounding the turret, a cam-surface on the ring, and means for rotating the ring to cause the cam-surface to operate to lock or unlock the turret, all substantially as described.

6. In combination with an intermittently-revolving turret, means for rotating the turret, a revoluble clamping-ring surrounding the turret, a cam-surface on the upper side of the ring adapted to engage the turret, and means for rotating the clamping-ring to exert pressure on the turret in a direction transversely to its plane of rotation, all substantially as described.

7. In combination with an intermittently-revolving turret, means for rotating the turret, a revoluble clamping-ring surrounding the turret, a cam-surface on the upper side of the ring adapted to engage the turret, means for preventing backward movement of the turret, and means for rotating the clamping-ring to exert pressure on the turret in a direction transversely to its plane of rotation, all substantially as described.

8. In combination with an intermittently-revolving turret, means for rotating the turret, means for holding it against rotation at intervals, a clamp adapted to exert pressure upon the turret in a direction transversely to its plane of rotation, and automatic means for operating the clamp.

9. In combination with an intermittently-revolving turret, means for revolving the turret, means for holding it against rotation, a clamping-ring surrounding the turret and adapted to exert pressure thereon in a direction transversely to its plane of rotation, and automatic means for operating the clamping-ring.

10. In combination with an intermittently-revolving turret, means for revolving the turret, means for holding it against rotation at intervals, a clamping-ring surrounding the turret, and means for rotating the ring whereby pressure is exerted thereon in a direction transversely to its plane of rotation, all substantially as described.

11. In combination with an intermittently-revolving turret, means for revolving the turret, locking-sockets in the edge of the turret, an index-bolt adapted to automatically engage the locking-sockets, a rotary clamping-ring, cam-surfaces located between the clamping-ring and adjacent surface, and means for rotating the ring to cause the cam-surfaces to coöperate in locking the turret, all substantially as described.

12. In combination with an intermittently-revolving turret, means for revolving the turret, a revoluble clamping-ring adapted in its rotation to lock or unlock the turret, and a clamping-bolt in engagement with a cam-slot in the clamping-ring, and the cam-slot located diagonally across the path of movement of the clamping-bolt, all substantially as described.

13. In combination with an intermittently-revolving turret, means for revolving the turret, a rotatable clamping-ring surrounding the turret and exerting clamping action without movement in an axial line, a sliding bolt in engagement with a cam-slot in the clamping-ring, and the cam-slot located diagonally across the path of movement of the sliding bolt, all substantially as described.

14. In combination with an intermittently-revolving turret, means for revolving the turret, locking-sockets in the turret, an index-bolt adapted to engage said sockets in the turret, a rotatable clamping-ring adapted to lock or unlock the turret in its rotation, and a clamping-bolt in engagement with the clamping-ring and with the index-bolt and adapted to be withdrawn by the movement of the latter, all substantially as described.

15. In combination with an intermittently-revolving turret, means for revolving the turret, locking-sockets borne on the turret, an index-bolt adapted to engage said sockets, a clamping-ring located on the turret, a bolt for operating the clamping-ring, and a single lever operating the index and clamping-ring bolts, all substantially as described.

16. In combination with an intermittently-revolving turret, means for revolving the turret, locking-sockets borne on the turret, a spring-actuated index-bolt adapted to engage said sockets, a locking-lever adapted to automatically engage the index-bolt to seat it in its socket, and a rotatable clamping-ring having a cam-surface coöperating with a cam-surface on the turret and adapted to be operated after the seating of the index-bolt, all substantially as described.

17. In combination with an intermittently-revolving turret, means for revolving the turret, locking-sockets borne on the turret, a spring-actuated index-bolt adapted to engage said sockets, a locking-lever adapted to seat the index-bolt in said socket and to rotate a clamping-ring, and the rotatable clamping-ring adapted in its rotation to clamp the turret, all substantially as described.

18. In combination with an intermittently-revolving turret having locking-sockets, means for revolving the turret, an index-bolt adapted to enter the sockets located in the turret, a rotatable clamping-ring, and a lever bearing a spring-seated plunger adapted to engage the index-bolt and also operating the clamping-ring.

19. In combination with an intermittently-revolving turret, means for revolving the turret, an index-bolt adapted to engage locking-sockets located in the turret and having a pin projecting through a slot in a clamping-ring bolt, the clamping-ring bolt for operating a clamping-ring, the rotatable clamping-ring adapted to lock the turret, and means for operating the clamping-ring and index bolts, all substantially as described.

20. In combination with a sliding carriage, means for moving the carriage, a sliding bolt borne on the carriage, a pivoted lever bearing a rotary head, means for operating the lever, and a plunger located in the rotary head and adapted to operate the sliding bolt, all substantially as described.

21. In combination, a base, a pivoted lever borne on the base, a rotary head mounted on the lever, a plunger located in the head, a sliding carriage, a revoluble turret mounted on the carriage, locking-sockets located in the carriage, an index-bolt adapted to engage said sockets and operated by the plunger on the swinging head, a clamping-ring borne on the turret and adapted to be operated by the pivoted lever, all substantially as described.

22. In combination with a revolving turret, means for revolving the turret, a clamping-ring borne on the turret, a cam-surface on the turret, and a cam located in a socket in the clamping-ring, all substantially as described.

23. In combination with a sliding carriage having a turret-socket, means for sliding the carriage, a revoluble turret located in the turret-socket, a clamping-ring mounted on the sliding carriage, and means for rotating the ring to clamp the turret in its socket and without movement of the ring in an axial line, all substantially as described.

24. In combination with a sliding carriage, means for reciprocating the carriage, a revolving turret mounted on the carriage, means for revolving the turret, locking-sockets located in the turret, an index-bolt adapted to engage said sockets, a revoluble clamping-ring mounted on the carriage and a clamping-ring bolt for operating the clamping-ring, all substantially as described.

25. In combination with a sliding carriage, means for reciprocating the carriage, a revolving turret mounted on the carriage, means for revolving the turret, an index-bolt borne on the carriage and engaging sockets in the turret, the sockets located in the turret, a clamping-ring bolt borne on the carriage and operatively connected with the index-bolt, and a clamping-ring mounted on the carriage and operatively connected with the clamping-ring bolt, all substantially as described.

26. In combination with a sliding carriage having a turret-socket with a broadened base, a revolving turret located in the socket, means for revolving the turret, an index-ring secured to the turret, an index-bolt adapted to engage sockets in the index-ring, a clamping-ring cover secured to the carriage and overlying the turret, a rotatable clamping-ring located in said cover and having a cam-surface acting on the turret, a cam-slot in the clamping-ring extending diagonally across the path of movement of a clamping-ring bolt, a sliding clamping-ring bolt mounted on the carriage, and means for operating the clamping-ring bolt, all substantially as described.

27. In combination with a work-holding clamp, a tool-holding arm overlying the clamp, a reciprocating support and a plural number of interengaging projections and recesses located on the arm and support, all substantially as described.

28. In combination with a work-holding clamp, a tool-holding arm overlying the clamp, a reciprocating support, and a plural number of projections having parallel axial lines, and corresponding recesses located on the arm and support, all substantially as described.

29. In combination with an intermittently-revolving turret, means for revolving the turret, a flange located on the turret, a clamping-ring interposed between said flange and a part overlying the flange, and means for rotating the clamping-ring.

30. In combination with an intermittently-revolving turret, means for revolving the turret, a revoluble clamping-ring supported in operative relation to the turret, a cam-surface on the ring, and means for rotating the ring to cause the cam-surface to operate to lock or unlock the turret.

GEORGE E. WITHERELL.

Witnesses:
ARTHUR B. JENKINS,
J. STERN.